United States Patent [19]

Krieger

[11] 4,435,357

[45] Mar. 6, 1984

[54] SUPPORT FOR USED FUEL RODS IN NUCLEAR INSTALLATIONS

[75] Inventor: Friedrich Krieger, Würzburg, Fed. Rep. of Germany

[73] Assignee: Gg. Noell GmbH, Würzburg, Fed. Rep. of Germany

[21] Appl. No.: 227,441

[22] Filed: Jan. 22, 1981

[30] Foreign Application Priority Data

Feb. 6, 1980 [DE] Fed. Rep. of Germany ....... 3004239

[51] Int. Cl.³ .............................................. G21C 19/00
[52] U.S. Cl. ................... 376/272; 376/442; 376/448
[58] Field of Search ............... 376/272, 438, 442, 448, 376/434, 436

[56] References Cited

U.S. PATENT DOCUMENTS 3,463,703 8/1969 Crandall ............................... 376/442
4,210,202 7/1980 Boyer ................................... 376/442

Primary Examiner—Donald P. Walsh
Attorney, Agent, or Firm—Horst M. Kasper

[57] ABSTRACT

A storage device for receiving spent nuclear fuel elements comprising a plurality of chambers which are separated by partitions from each other. The partitions form arches in such a way that relatively large arches alternate with relatively small arches. Each arch of relatively large size engages physically an arch of relatively small size, and vice versa. Considering two contiguous identical partitions, this implies that the partitions are arranged out of registry.

11 Claims, 1 Drawing Figure

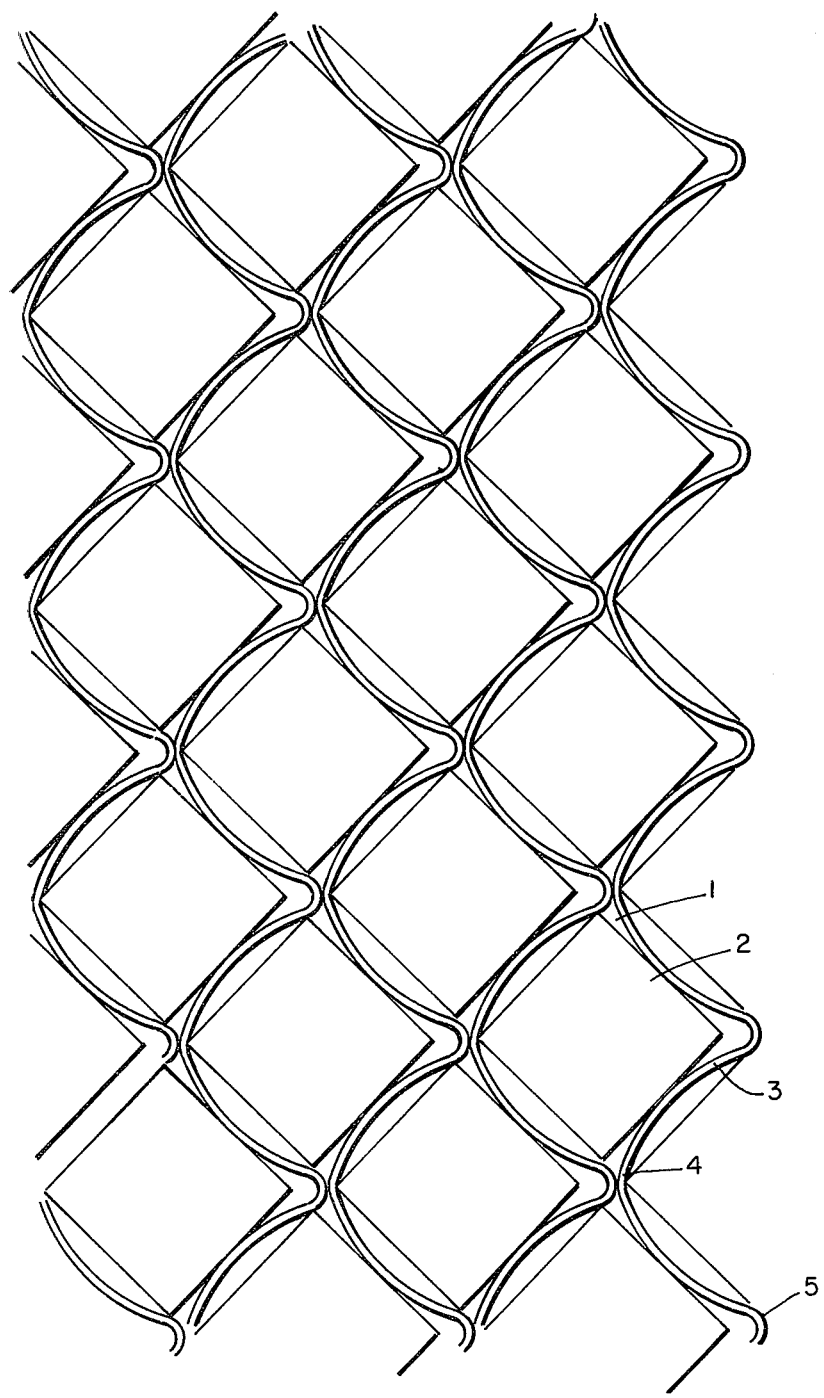

SUPPORT FOR USED FUEL RODS IN NUCLEAR INSTALLATIONS

BACKGROUND OF THE INVENTION

This invention refers to structures for receiving and storing spent fuel elements derived from nuclear plants, which structures comprise a plurality of chambers for the fuel elements.

The German "Offenlegungsschrift" DT-OS No. 2723849 describes one of these storage structures. In this storage structure the wall separating one chamber from a plurality of other chambers is formed by four strips of sheet metal, which form two mirror-like pairs of strips, the sheet metal strips of each pair being arranged in parallel relation.

The principal object of this invention is to provide a more cost-effective structure than that which is described above, which meets the requirement of equal and safe spacing between the fuel elements which are stored therein.

SUMMARY OF THE INVENTION

This problem is solved, according to the present invention, by forming the entire wall, or partition, between one chamber and a plurality of other chambers by two sheet metal strips. The two sheet metal strips form also the entire partition between an additional individual chamber and a plurality of other chambers. These strips have the same configuration between contiguous chambers.

Thus the invention provides a storage device whose walls or partitions require but little material, than can be rapidly fabricated in a simple way, and that takes care of a secure spacing of the individual fuel elements.

A particularly desirable embodiment of the invention has the following features.

(a) Each of the two strips has alternating arching or semi-circular bends in opposite directions, relatively small arches alternating with relatively large arches.

(b) Each of the two strips is arranged out of registry with the other in such a way that each relatively small arch is in physical engagement with a relatively large arch, and vice versa.

BRIEF DESCRIPTION OF THE DRAWING

The drawing illustrates a preferred embodiment of the invention. To be more specific, it shows a storage structure in top plan view seen in the direction of the longitudinal axes of the nuclear fuel elements.

DESCRIPTION OF PREFERRED EMBODIMENT

Reference numeral 1 has been applied to indicate one of a plurality of chambers intended to receive and store a spent fuel element as used in nuclear plants. Each of the plurality of chambers 1 is formed by two sheet metal strips 3 which have a predetermined profile, as shown. To be more specific, each of the pair of strips 3 form a sequence of opposite arches. A large arch 4 alternates with a relatively small arch 5. Each large arched point 4 is in physical contact with a small arched point 5. As a result of this fact immediately adjacent strips 2 are displaced in a direction longitudinally thereof.

What I claim as my invention is:

1. A structure for storing a plurality of spent fuel elements of nuclear power plants comprising a plurality of chambers wherein the wall separating one chamber from a plurality of other chambers comprises only two elements in the form of strips which strips also form all of the wall separating additional individual chambers from a plurality of other additional chambers, and wherein said pair of strips for separating one chamber from a plurality of other chambers are all of the same arched shape having large concave cylindrical surfaces on one side and large corresponding convex cylindrical surfaces on the other side of the strip such that the spacing between the fuel elements from each other is provided by the curved arched strips of the structure and where the separation distance for neighboring fuel elements is provided by one of the neighboring fuel elements contacting the strip tangentially at the convex cylindrical side surface part of the arched strip while the other neighboring fuel element contacts the strip about near the outer edge of the concave cylindrical side surface part and where the distance of the neighboring fuel elements from each other depends on the size of the curvature of the arched strip along the neighboring sides of the adjacent fuel elements.

2. A structure as specified in claim 1 wherein
   (a) each of said strips has alternating bends forming curvatures in opposite directions, the size of said curvatures alternating between a relatively small curvature and a relatively large curvature; and wherein
   (b) each of said strips is arranged out of registry with the other in such a way that each point of relatively small curvature is in physical engagement with one point of relatively large curvature.

3. A structure for storing a plurality of spent fuel elements comprising a plurality of chambers which are separated by partitions from each other, said structure comprising a plurality of partitions forming arches in such a way that relatively large arches alternate with relatively small arches and that said relatively large arches engage physically said relatively small arches.

4. The structure as specified in claim 1 wherein the locations provided for stored spent fuel elements by the structure form an about tetragonal array.

5. The structure as specified in claim 1 wherein the fuel rods to be stored have four longitudinal edges.

6. The structure as specified in claim 1 wherein the structure is characterized by translational symmetry in two about orthogonal directions.

7. The structure as specified in claim 6 wherein the spacing for the translational symmetry in the two about orthogonal directions is equal.

8. The structure as specified in claim 6 wherein a planar translational symmetry unit corresponds to the area of about the cross-section of one spent fuel element.

9. The structure as specified in claim 1 wherein one layer of the structure provides two tangential contact points to two neighboring sides of a square spent fuel element and a following layer of the structure provides contact to three corners adjacent to the two other sides of the square spent fuel element.

10. The structure as specified in claim 1 wherein each of the two strips has alternating semi-circular bends in opposite directions and where relatively small arches are alternating with relative large arches with oppositely directed radii of curvature and where each of the two strips is arranged out of registry with the other in such a way that each relatively small arch is in physical engagement with a relatively large arch of oppositely directed curvature, and vice versa.

11. A structure for storing a plurality of spent square fuel elements of nuclear power plants comprising a plurality of chambers wherein the wall separating one chamber from a plurality of other chambers comprises only two elements in the form of strips which strips also form all of the wall separating additional individual chambers from a plurality of other additional chambers, and wherein said pair of strips for separating one chamber from a plurality of other chambers are all of the same arched shape having large concave cylindrical surfaces on one side and large corresponding convex cylindrical surfaces on the other side of the strip such that the spacing between the square fuel elements from each other is provided by the curved arched strips of the structure and where the separation distance for neighboring square fuel elements is provided by one of the neighboring square fuel elements contacting the strip tangentially at the convex cylindrical side surface part of the arched strip such that the arched strip has two tangential contact lines with the square fuel element while the other neighboring square fuel element contacts the strip about near the outer edge of the concave cylindrical side surface part such that the square fuel element contacts the same strip with three of its edge lines and where the distance of the neighboring square fuel elements from each other depends on the size of the curvature of the arched strip along the neighboring sides of the adjacent fuel elements and where the overall structure is characterized by translational symmetry in about two orthogonal directions.

* * * * *